United States Patent [19]

George

[11] 4,181,142
[45] Jan. 1, 1980

[54] SIPHON APPARATUS

[76] Inventor: John A. George, Uniontown, Kans.

[21] Appl. No.: 821,404

[22] Filed: Aug. 3, 1977

[51] Int. Cl.$^2$ ............................................. F04F 10/00
[52] U.S. Cl. .................................. 137/124; 137/139; 137/143
[58] Field of Search ................ 137/124, 128, 139, 143

[56] References Cited

U.S. PATENT DOCUMENTS

| | | | |
|---|---|---|---|
| 871,427 | 11/1907 | Miller | 137/139 |
| 1,037,791 | 9/1912 | Miller | 137/143 |
| 1,274,578 | 8/1918 | Nicholson | 137/143 X |
| 1,755,218 | 4/1930 | Jertberg . | |
| 1,929,638 | 10/1933 | Jewell . | |
| 3,079,939 | 3/1963 | Lapray | 137/128 |
| 3,499,585 | 3/1970 | Halff et al. . | |

FOREIGN PATENT DOCUMENTS

| | | | |
|---|---|---|---|
| 671 | 5/1885 | Sweden | 137/139 |
| 7258 | of 1888 | United Kingdom | 137/139 |
| 1122 | of 1908 | United Kingdom | 137/139 |
| 1984 | of 1913 | United Kingdom | 137/139 |
| 643446 | 9/1950 | United Kingdom | 137/124 |

*Primary Examiner*—Gerald A. Michalsky
*Attorney, Agent, or Firm*—Fishburn, Gold & Litman

[57] ABSTRACT

A siphon apparatus is provided which includes a liquid storage reservoir in which is mounted a conchoidial-shaped siphon having an inlet end and an outlet end. A trigger device is provided and is connected to the siphon and is operable for actuating the siphon action of the siphon when a predetermined level of liquid is reached in the reservoir. The apparatus requires no moving parts for the operation thereof.

15 Claims, 2 Drawing Figures

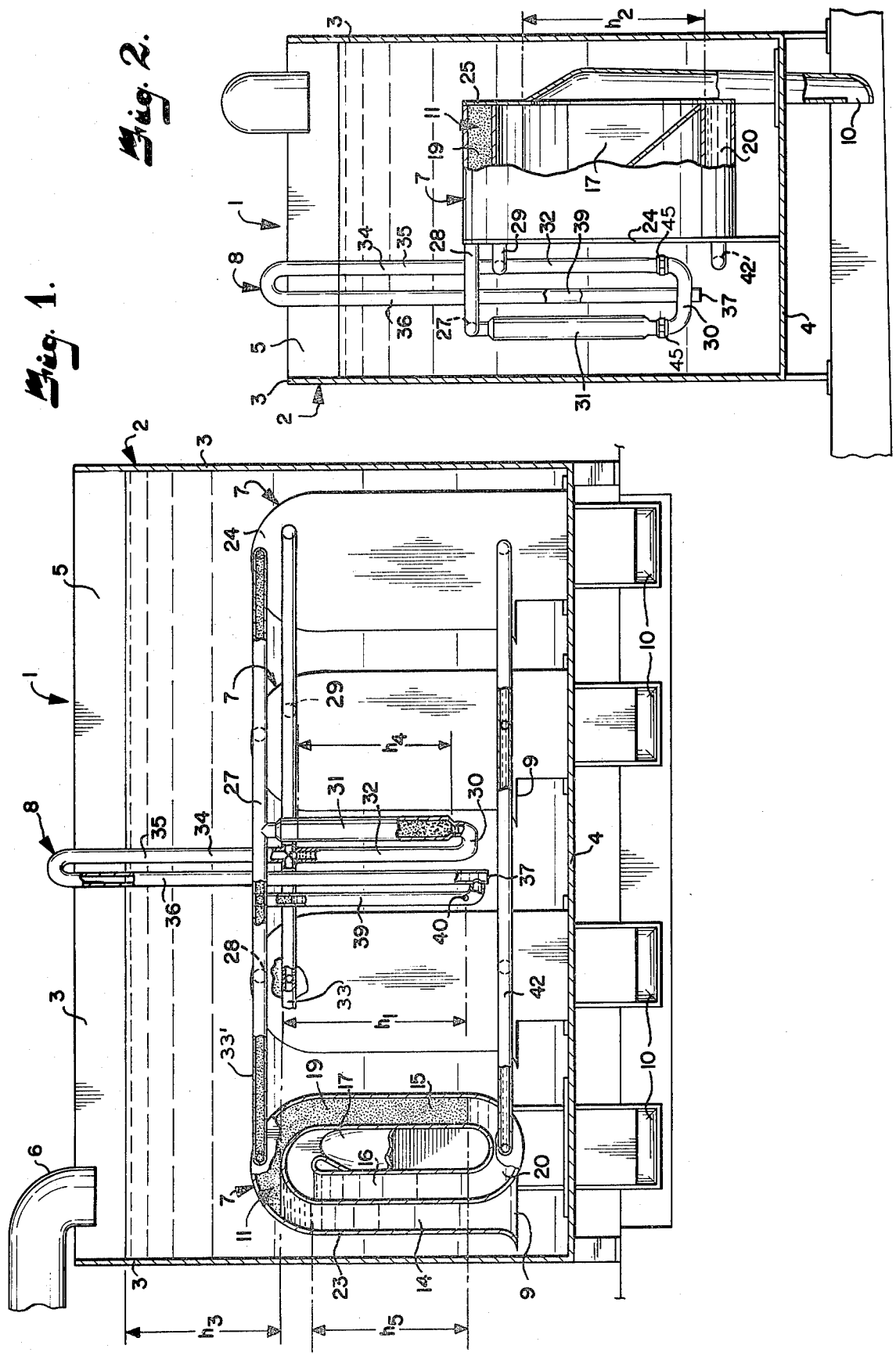

SIPHON APPARATUS

Many siphon apparatuses are known in the art and are operable for discharging a liquid from a reservoir at a predetermined time interval and operate with some degree of success. One problem attendant with siphons known in the art is that same are not very compact and are made from generally double U-shaped tube with one of the U's being inverted relative to the other U and with one U forming a bonnet or air trap and the other forming a liquid trap. These siphons are usually made from a tube which is normally round in transverse cross section.

The present invention relates to siphon apparatus and provides an improved siphon apparatus which operates effectively and is well adapted for high flow rates of liquid from a reservoir. The siphon apparatus is also well adapted for use in a reservoir containing a plurality of siphons which operate in conjunction with one another such as, for example, in the flushing of a livestock barn floor wherein the siphons operate in unison in a dependable manner. The triggering means connected to the siphon are well adapted for insuring that each siphon is primed and ready for operation for each succeeding siphon operation and thereby assuring positive operation of the entire siphon apparatus.

The present invention provides a unique shape of siphon which has a double U configuration with one U being inverted relative to the other and forming an air trap while the other U forms a liquid trap. By the unique configuration of the siphon, which is conchoidal or spiral, portions of the tube share a common wall which reduces the overall weight of the siphon compared to a comparably sized siphon known in the art. Also, the rectangular cross section with the vertical dimension minimized aids the purging of air from the air trap thus assisting in priming of much larger cross-sectional area siphons than possible with conventional configurations. Also, the continuity of hydraulic cross-section and transition of flow from leg to leg of the siphon results in less friction loss and thus greater flow rates per unit of effective head. Also, this shape of siphon provides a relatively more compact design which lends itself more readily to placing a plurality of the siphons within a reservoir and thereby provide a plurality of separate discharges.

The principal objects and advantages of the present invention are: to provide a siphon having a unique configuration, i.e., generally conchoidally or spirally shaped, which is compact in shape and size; to provide a siphon apparatus with a positive trigger means for actuating the siphon action of the siphon with the trigger means being positive in operation and minimizing malfunctioning of the siphon and trigger means; and to provide such an apparatus which is well adapted for its intended use, economical to manufacture and easy to maintain.

Other objects and advantages of the present invention will become apparent from the following detailed description taken in connection with the accompanying drawings wherein are set forth by way of illustration and example certain embodiments of the present invention.

FIG. 1 is a side sectional view of a siphon apparatus showing a plurality of siphons and trigger means in a reservoir with sections broken away to show structural details.

FIG. 2 is an end view of FIG. 1 with sections thereof broken away to show structural details of the siphon.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate structure.

The reference numeral 1 designates generally an apparatus which includes a tank 2 which is comprised of sidewalls 3 and a bottom wall 4. The tank defines a storage reservoir 5 adapted for storing a quantity of liquid. The reservoir 5 has connected thereto a suitable source of liquid as by a conduit 6 for filling of the reservoir 5 with liquid. The apparatus 1 further includes at least one siphon 7 which has connected thereto trigger means 8 which is operable for selectively actuating operation of the siphon at a predetermined level of liquid contained within the reservoir 5.

A preferred form of siphon 7 is that as illustrated, however, it is to be understood that other forms of siphons can be used with the below described trigger means 8. As illustrated, the siphon 7 is generally conchoidially-shaped or spiral in shape and includes a plurality of legs having at least two traps between certain legs. The siphon 7 has an inlet 9 and an outlet 10 and defines a flow path 11 extending therebetween. As used hereinbelow, the inlet 9 is at the upstream end of the siphon 7 and the outlet end 10 is at the downstream end of the siphon 7 and is at a level below that of the inlet 9. The siphon 7 is comprised of a plurality of legs which, as illustrated, includes four legs, 14, 15, 16 and 17, listed in order of their flow relation relative to one another from the upstream end to the downstream end wherein the leg 15 is downstream of the leg 14 and the leg 16 is downstream of the leg 15 and the leg 17 is downstream of the leg 16. A trap 19 is formed between the legs 14 and 15 which depend from the trap 19 and a trap 20 is formed between the legs 15 and 16 which extend upwardly from the trap 20. In operation the trap 19 is operable for trapping air therein and the trap 20 is operable for trapping water or other liquid therein.

The legs 14, 15, 16 and 17 are preferably generally vertically disposed with the leg 16 having a maximum liquid pressure height of $h_2$ and the leg 14 having a maximum pressure height of $h_1$ which is measured from a weephole 40 22 to the bottom of the surface of the interior curved wall between the legs 14 and 15 as is more fully described hereinbelow. As can be best seen in FIG. 1, a wall 23 is spirally configured and defines two sides of the leg 14, two sides of the leg 16 and two sides of the leg 15 and also defines a portion of the leg 17. It is to be noted that the wall 23 is a common wall between certain of the legs as, for example, between legs 14 and 16, 15 and 17, and 16 and 17. In a preferred form of the present invention, the inlet is enlarged and has a downstream converging lead-in to the leg 14 to improve the flow characteristics of the siphon 7. Also, the outlet 10 preferably has a flow opening sized smaller than that of the inlet 9 and preferably the flow path 11 has a decreasing cross-sectional area such that the cross-sectional area of the discharge is 60% to 85% of the intake cross-sectional area. This is preferred so that the head loss of the liquid flowing through the siphon 7 is higher toward the outlet 10 with the maximum head loss per unit of distance traveled being more concentrated at the outlet 10. It is preferred that the leg 14 and inlet 9 be on the exterior of the siphon 7 and the leg 17 starts generally in the interior or center of the siphon 7 and terminates exteriorly of the spiral portion of the siphon 7. In other words, the leg 16 and a portion of the leg 17 are positioned between outer disposed legs 14 and 15. The siphon 7 is suitably mounted within the reservoir 5 such as by braces with the outlet 10 extending through an opening through the bottom wall 4 of the tank 2. As best seen in FIG. 2, a substantial portion of the leg 17 is defined by opposed walls and is positioned exteriorly of the spiral portion of the siphon 7 and is secured to or integral with an exterior wall 25 thereof. It is preferred that the cross-section of the flow path 23, i.e., generally transverse to the direction of flow, be generally rectangular in shape which permits the use of a generally planar wall 23 and flat front and back walls 24 and 25 suitably secured to the wall 23 at opposite side edges. The outlet 10 is positioned at a level below the inlet 9.

As shown the wall 23 is generally spiral shaped, as seen in FIG. 1. The wall 23 has five generally planar or flat portions in spaced apart and generally parallel relation. Pairs of the planar portions define opposite sides of the legs 14, 15 and 16 and a portion of the leg 17. The wall 23 also includes four arcuate portions extending between respective planar portions. Pairs of the arcuate portions are in spaced apart relation and define respective traps 19 and 20. Preferably the arcuate portions in each trap defining pair are generally concentric. Also, it is preferred that the wall 23 be continuous and one piece.

The trigger means 8 in the illustrated structure includes a conduit means 27 which has one open end opening into the siphon 7 preferably at a position 28, near but slightly downstream of the highest vertical extremity of trap 19 at a position on the upstream side of the trap 20. The conduit means 27 includes a conduit portion 33' which opens into the siphon at 28 which is shown at a position in the trap 19 so as to allow most of the air to be bled from trap 19 upon actuation of the trigger means 8. The other end of the conduit means 27 includes a conduit portion 33 which opens into the siphon 7 as at 29 on the downstream side of the trap 20 and preferably opens into the leg 17. This is so as to prevent liquid from entering same during rise of the liquid in the leg 16. Also, by opening into the leg 17, the pressure will be atmospheric since the leg 17 when empty is at atmospheric pressure. The conduit means 27 includes a trap 30 positioned between two preferably generally vertical legs 31 and 32 with the leg 32 being between point 29 and the trap 30 and the leg 31 being between the point 28 and the trap 30. In a preferred form of the present invention, the leg 31 has a transverse cross-sectional size greater than the leg 32 so that same can hold a greater quantity of fluid by a ratio of about 2:1 or greater per unit height than the leg 32. The purpose of this increased storage capacity is more fully described below. The liquid in the leg 32 has a pressure height of $h_4$ as best seen in FIG. 1. Preferably, the point 28 is positioned at a level above the point 29. The maximum $h_4$ is that height from the conduit portion 33, to which the leg 32 is connected, to the top of the trap 30.

The trigger means 8 further includes a siphon release conduit 34 which has one end communicating with the conduit means 27 downstream of the trap 30, i.e., the downstream side being that between the trap 30 and the point 29. Preferably, the conduit 34 opens at one end into the conduit means 27 between the point 29 and the trap 30 and more preferably between a downstream end of the leg 32 and the point 29. The conduit 34 is generally U-shaped with a portion of the interior thereof being positioned at a level above the maximum filled height of liquid in the reservoir 5. As shown, the conduit 34 has two preferably generally vertical leg portions 35 and 36 with the leg 35 extending upwardly from and connected to the conduit means 27 with the leg 36 extending downwardly into the reservoir 5 having an open end 37 positioned at a level above that of the siphon inlet 9. The position of the end 37 is such that when the level of the liquid in the reservoir falls below the end 37, the conduit 34 is open to the atmosphere so that air can flow through the siphon release tube into the conduit means 27 and into the leg 17 so as to prevent the siphon action in the siphon 7 from emptying the trap 20. This assures that the trap 20 retains sufficient water to fill leg 16 to a height greater than $h_2$. The siphon release conduit 34 is highly desirable although same is not necessary, particularly on single siphon units.

The siphon 7 is provided with a pressure equalizing means such as the conduit 39 which communicates with the siphon 7 at a position upstream of the trap 20 and is operable for allowing the upstream side of the siphon 7 to be at atmospheric pressure during filling of the reservoir until the level of liquid reaches a predetermined level. As shown, the conduit 39 has one end communicating with the siphon upstream of the trap 20 and has a weephole 40 adjacent the other end opening into the reservoir 5, preferably at a level above that of the open end 37 of the tube 34. Also, it is preferred that the conduit 39 have a lower disposed open end thereof connected into the leg 36 at the end 37 to assure that the conduit 39 and leg 36 become open to the atmosphere at substantially the same time or level of water. When the level of liquid in the reservoir 5 reaches the weephole 40, it is closed to the atmosphere thereby preventing air escaping from the siphon 7 from the upstream side of the trap 20 whereby pressure builds up in the siphon 7 in the trap 19 and the leg 15. This causes the level of liquid in the trap 20 to rise in the leg 16 to its maximum height before same flows over into the leg 17. The pressure in the leg 15 and trap 19 is equal to the difference in the height of the liquid in the legs 15 and 16 and is denoted as $h_5$ which is a maximum of $h_2$. The elevation of the weephole 40 is such that the elevation difference between same and the bottom of the trap 19 is denoted as $h_1$ which is greater than $h_2$. The maximum $h_4$ is less than the maximum $h_2$. The maximum $h_1$, is greater than the maximum $h_2$. Preferably, the tube 39 is connected to the conduit means 27 between the trap 30 and the point 28.

As illustrated in FIG. 1, a plurality of siphons 7 can be connected to the same trigger means 8 with the siphons 7 being substantially the same and having the points of communication with the trigger means 8 the same by being manifolded together as illustrated by the conduit means 27. To equalize the pressures in the siphons, a conduit 42 communicates between the traps 20 of each of the siphons 7 whereby the same liquid level height will be obtained in each of the legs 16 so that the siphons begin the siphon action at substantially the same time.

The present invention is more fully understood by a description of the operation thereof. With the reservoir 5 substantially empty, i.e., the water level below that of the inlets 9, water is supplied to the reservoir 5 to fill same to a predetermined level. As the water level begins to rise, water will move into the leg 14 and no pressure is built up in the trap 19 until the liquid level reaches the weephole 40. Any rise in the liquid level above the weephole 40 begins to increase the pressure in the trap 19 thereby causing the liquid level to rise in the leg 16. The pressure in the trap 19 is equal to $h_3$ which is the height of the liquid level above that of the liquid level in the leg 14. $h_3$ is equal to $h_4$ and to $h_5$ until the siphon primes. As the tank fills, $h_3$ increases as do $h_4$ and $h_5$ until $h_4$ reaches its maximum which is less than $h_2$. When this occurs, air trapped in the trap 19 passes through the trap 30 thereby discharging the liquid contained in the trap 30 and leg 32 out into the leg 17 for discharge through the outlet 10. This discharge then allows the air trapped in the trap 19 to be discharged through the leg 17 via conduit portions 33 and 33' legs 31 and 32 and trap 30 because of the pressure differential. This causes the water in leg 14 to overflow into the leg 15 to prime the siphon wherein the water flows from the trap 20 through the leg 16 and out the leg 17 for discharge through the outlet 10. During the discharge flow, the conduit means 27 also carries a limited quantity of water from the upstream side of the trap 20 to the downstream side of the trap 20 for discharge. As the water flows through the siphon 7, the gradually decreasing cross-sectional area of the discharge causes the water velocity to increase in this portion of the siphon. Therefore, more of the head loss through the siphon is concentrated on the discharge side of the trap 20 which helps maintain the siphon as the effective pressure head decreases to low levels because of loss of water from the reservoir. When the water level in the reservoir 5 falls below the weephole 40 in the open end 37, air is drawn through the tube 35 and tube 39 into the siphon 7 which begins to decrease the siphon effectiveness because of the introduced air. By introducing the air in this manner into the siphon 7 at a point between the trap and the discharge, the air serves to prevent the siphon forces from emptying the trap 20 and the trap 30 as they must have water therein for the next cycle. When the water level in the reservoir 5 falls below the inlet 37, air is drawn into siphon through the legs 36 and 39 and into the trap 19 and leg 17 and the siphon action is terminated until the siphon primes again as described above.

Since legs 14 and 15 are substantially longer than $h_2$, the tank can be filled with water starting with trap 20 empty. Water will rise in leg 14 with $h_3$, $h_1$ and $h_5$ equal to zero until water overflows into leg 15 filling trap 20. $h_2$, $h_3$ and $h_5$ will then increase as the water level rises, elevating the water column in leg 16 until $h_5$ exceeds maximum $h_4$, thus flushing the tank.

With the present invention the siphon actuation level of liquid in the reservoir 5 can be easily changed. By tilting or canting the siphon 7 forward or backward as seen in FIG. 1, the maximum pressure heights of legs 14 and 16 can be changed accordingly. The triggering means 8 would also be changed such that the above described height relationships are maintained. A preferred way of varying the actuation level would be to change the level of the trap 30 to effect a change in the maximum obtainable $h_4$. This can be accomplished expeditiously by the use of dresser couplings or slip or expansion joints or the like 45 connecting the trap 30 in selective movable relation to the legs 31 and 32. This would allow changing the actuation level from just above the top of the siphon 7 to a full reservoir level without any major alteration to the structure.

The above described apparatus is particularly well adapted for use in flushing systems used in livestock barns and the like wherein large quantities of water are needed per unit time to achieve effective flushing. This is an improvement over current flushing systems such as those which use a tipping tank or the like wherein larger quantities of water are required in a short time period than is normally available through the water supply system by virtue of the fact that a large quantity of water can be stored in the reservoir 5 for discharge in a short period of time. The operation of a ganged set of siphons is the same as that for the single siphon described above.

It is to be understood that while there has been illustrated and described certain forms of the present invention, it is not to be limited to the specific form or arrangement of parts herein described and shown except to the extent that such limitations are found in the claims.

What is claimed and desired to be secured by Letters Patent is:

1. A siphon liquid discharge apparatus including:
   (a) a tank means defining a liquid storage reservoir; and
   (b) a first tubular member forming a first flow path, said first tubular member having an inlet in flow communication with the reservoir and an outlet opening exteriorly of said tank with the first flow path extending between said inlet and outlet, said first tubular member being configured to form a generally conchoidally-shaped flow path portion, said first tubular member having a plurality of legs and a plurality of traps, said legs including a first leg and a second leg and said legs including a first liquid trap connecting the first leg and second leg in flow communication, said legs further including a third leg forming a portion of the first flow path between the inlet and a first air trap, said first air trap connecting the third leg and first leg in flow communication and a fourth leg connected in flow communication to the second leg and forming a portion of the first flow path between the second leg and the outlet, said first, second, third and fourth legs are generally parallel, said second leg and a portion of the fourth leg are positioned generally between said first leg and third leg.

2. An apparatus as set forth in claim 1 including:
   (a) first means operably connected to said first tubular member and operable for starting siphon action in the first member at a first predetermined level of liquid in the reservoir and operable for introducing air into the first flow path between the first liquid trap and the outlet at a second predetermined level of the luquid in the reservoir lower than the first level.

3. An apparatus as set forth in claim 2 wherein said first means including:
   (a) a first conduit means opening into the first flow path at a first point on an upstream side of the first liquid trap and at a second point on the downstream side of the first liquid trap, said first conduit means forming a second liquid trap between a fifth leg and a sixth leg of said first conduit means with said sixth leg being, flow-wise, between the fifth leg and the second point.

4. An apparatus as set forth in claim 3 wherein said first means including:
(a) a second conduit means having a first conduit portion communicating with the first flow path on the downstream side of said first liquid trap, said second conduit means also having a first opening opening into said reservoir at a level above the inlet end, said second conduit means having a second air trap positioned above a siphon actuating level of liquid in the reservoir.

5. An apparatus as set forth in claim 4 including:
(a) third conduit means communicating with said first flow path between the inlet and the first liquid trap, said third conduit means having a second opening opening into said reservoir at a level above the inlet.

6. An apparatus as set forth in claim 3 wherein:
(a) said fifth leg having a larger liquid storage volume per unit height than said sixth leg.

7. An apparatus as set forth in claim 3 wherein: said third leg has a maximum pressure height $h_1$, said second leg has a maximum height $h_2$ and the sixth leg has a maximum pressure height $h_4$, the maximum pressure height $h_1$ of the third leg is greater than the maximum pressure height $h_2$ of the second leg and the maximum pressure height $h_2$ is greater than the maximum pressure height $h_4$ of the sixth leg.

8. An apparatus as set forth in claim 2 wherein:
(a) said first flow path having a decreasing cross-sectional area from the inlet to the outlet such that the outlet has a cross-sectional area of between about 60% to about 85% of the cross-sectional area of the inlet.

9. An apparatus as set forth in claim 2 including:
(a) a plurality of said first member each mounted in the reservoir and each operably connected to said first means in a manner whereby each said first member begins siphon action at substantially the same level of liquid in the reservoir.

10. An apparatus as set forth in claim 2 wherein:
(a) said first means having a portion operable for selectively changing the first predetermined level of liquid.

11. An apparatus as set forth in claim 2 wherein said second leg has a maximum pressure height and said first means includes:
(a) a first conduit means opening into said first flow path at a first point upstream of said first liquid trap and opening into said first flow path at a second point on a downstream side of said first liquid trap, said first conduit means defining a second flow path communicating between said first and second points and also defining a second liquid trap in said second flow path, said second liquid trap including a fifth leg and a sixth leg having a maximum pressure height with the maximum pressure height of said sixth leg being less than the maximum height of said second leg of said siphon means.

12. An apparatus as set forth in claim 11 including:
(a) a second conduit means having a first open end opening into said reservoir at a level above said first inlet and also communicating with said first flow path downstream of said first liquid trap, said second conduit means defining a second flow path having a portion thereof positioned above a siphon actuating level of liquid in said reservoir; and
(b) third conduit means communicating with said first flow path upstream of said first liquid trap and also opening into said reservoir at a level above the level of said first inlet.

13. An apparatus as set forth in claim 1 wherein said first member including:
(a) a first wall member being generally spirally shaped with a plurality of generally planar portions in spaced apart generally parallel relation defining opposite sides of at least a portion of the first, second and third legs, said first wall member also having a plurality of arcuate portions extending between respective planar portions with certain of the arcuate portions being in spaced apart relation and partially defining the first liquid trap and the first air trap; and
(b) second and third wall members secured to opposite side edges of said first wall member.

14. An apparatus as set forth in claim 1 wherein:
(a) said third leg has a maximum pressure height $h_1$ and said second leg has a maximum pressure height $h_2$ and the maximum pressure height $h_1$ of the third leg is greater than the maximum pressure height $h_2$ of the second leg.

15. An apparatus as set forth in claim 1 wherein:
(a) said first leg, second leg, third leg, an upper portion of the fourth leg, first air trap, first liquid trap and a portion of the tubular member connecting the second leg and fourth leg in flow communication define the generally conchoidally-shaped flow path portion, a lower portion of the fourth leg projects outwardly from a wall of the tubular member defining one side of the generally conchoidally-shaped flow path, said lower portion of the fourth leg defining said outlet.

* * * * *